April 11, 1933.  E. O. SHREFFLER ET AL  1,903,556
VACUUM CONTROLLED CLUTCH AND BRAKE OPERATING MECHANISM
Filed March 2, 1931  4 Sheets-Sheet 4
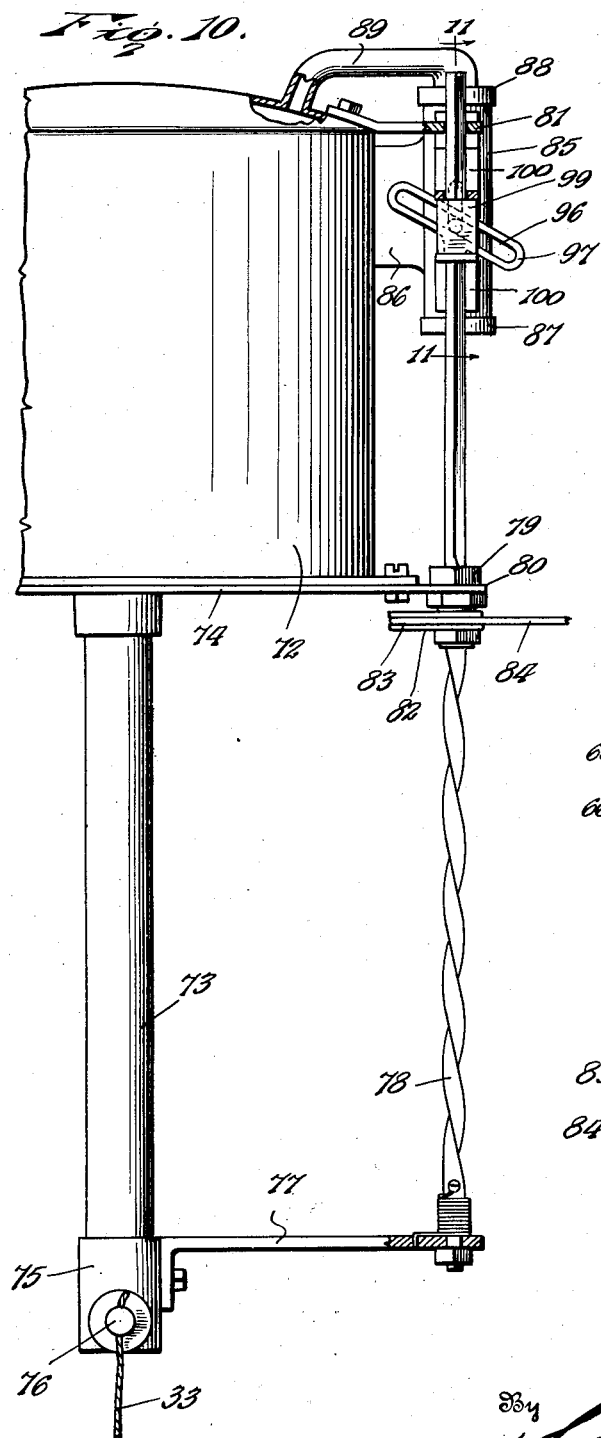
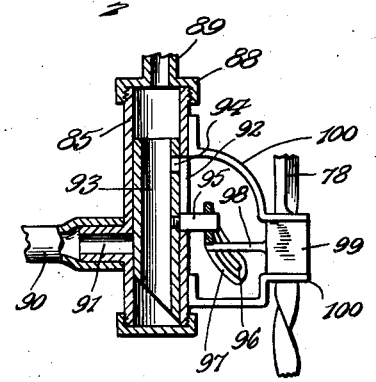
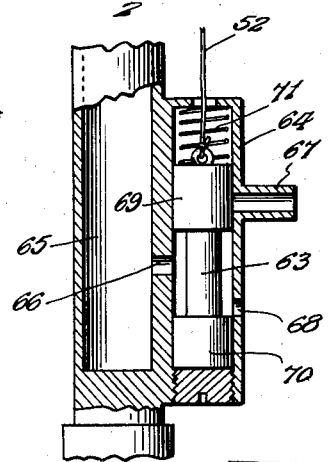
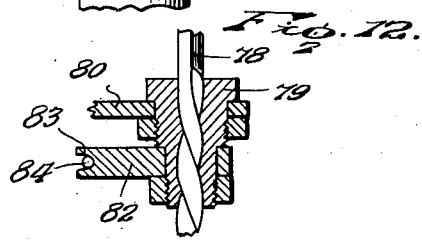

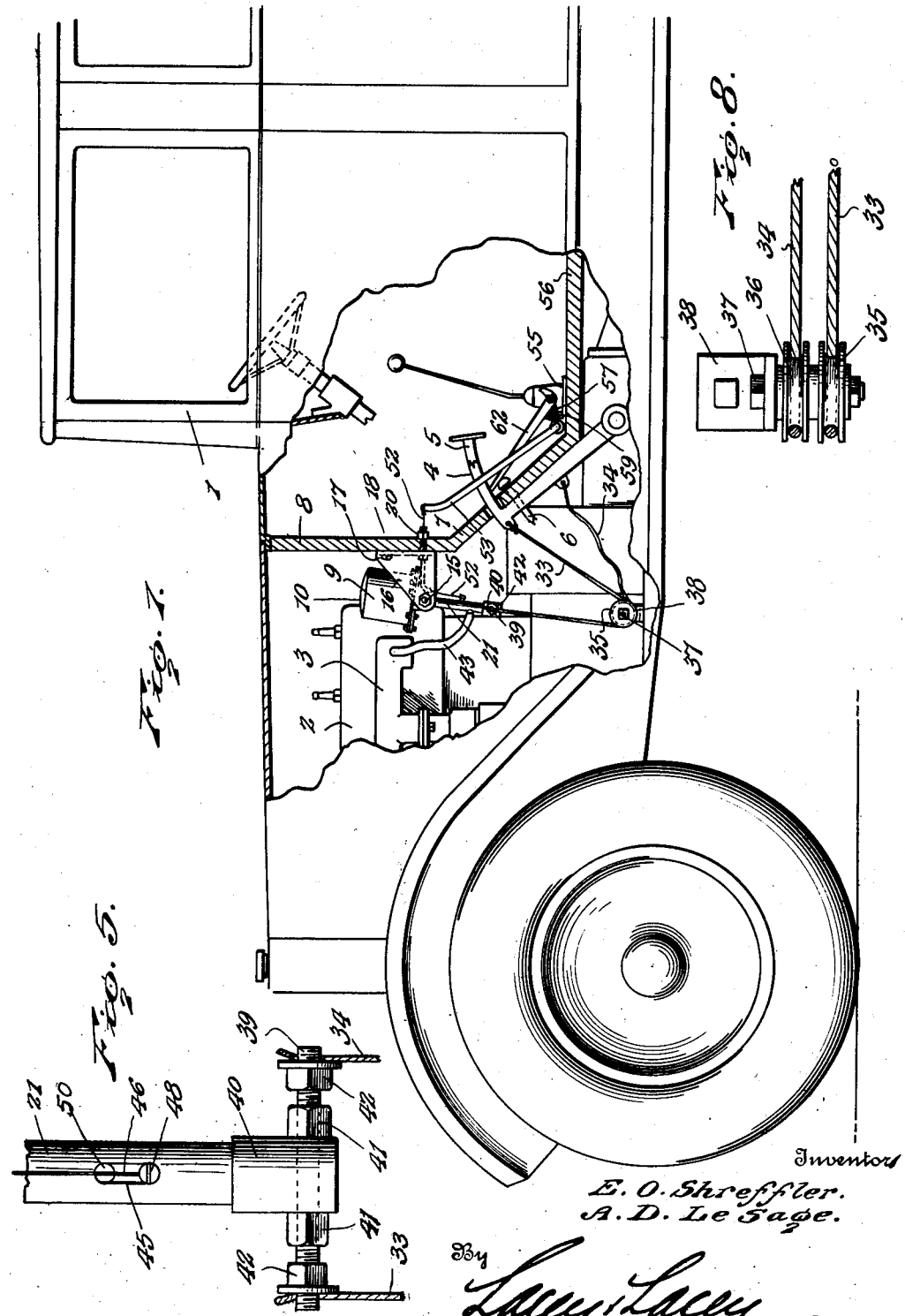

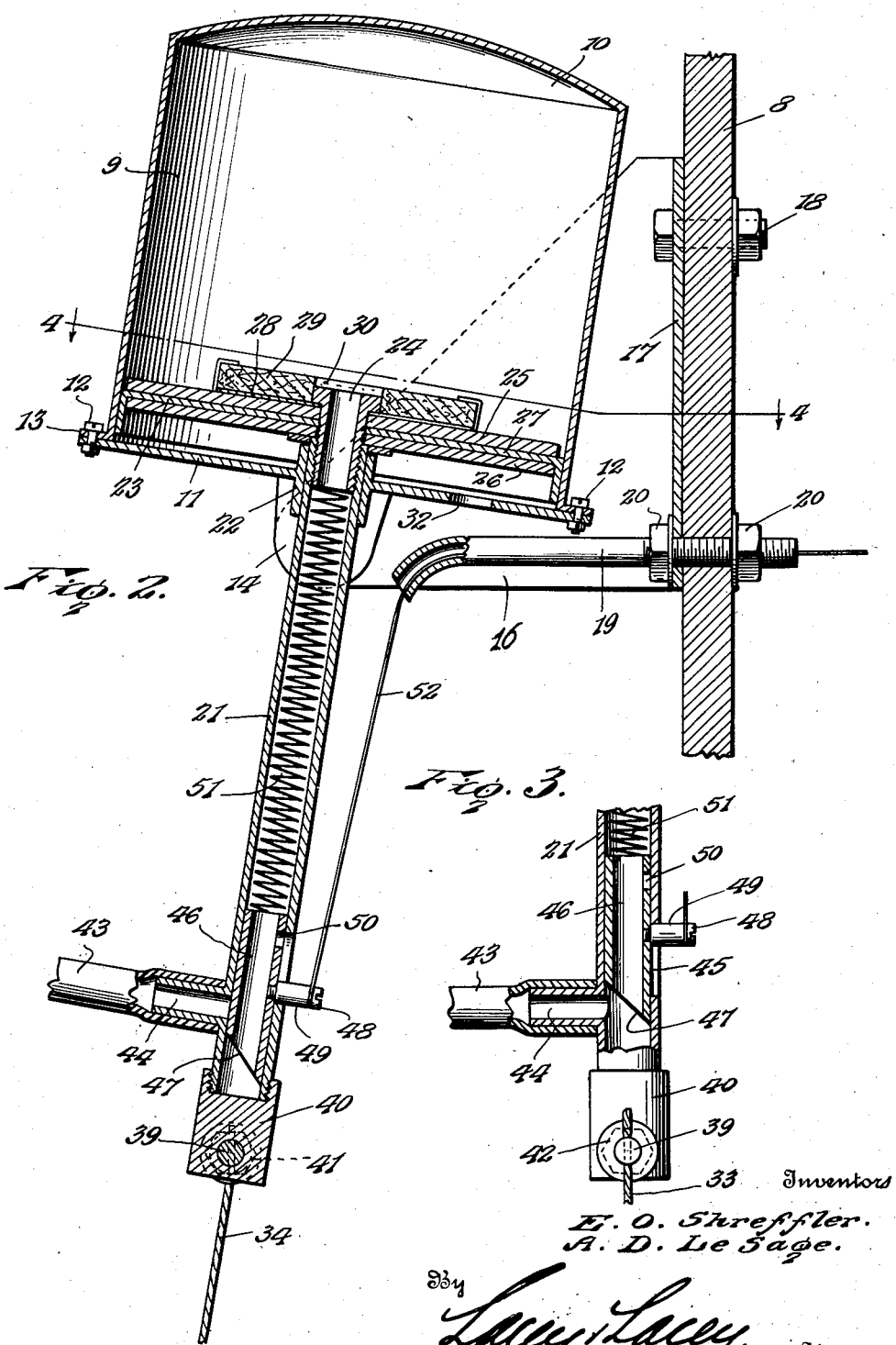

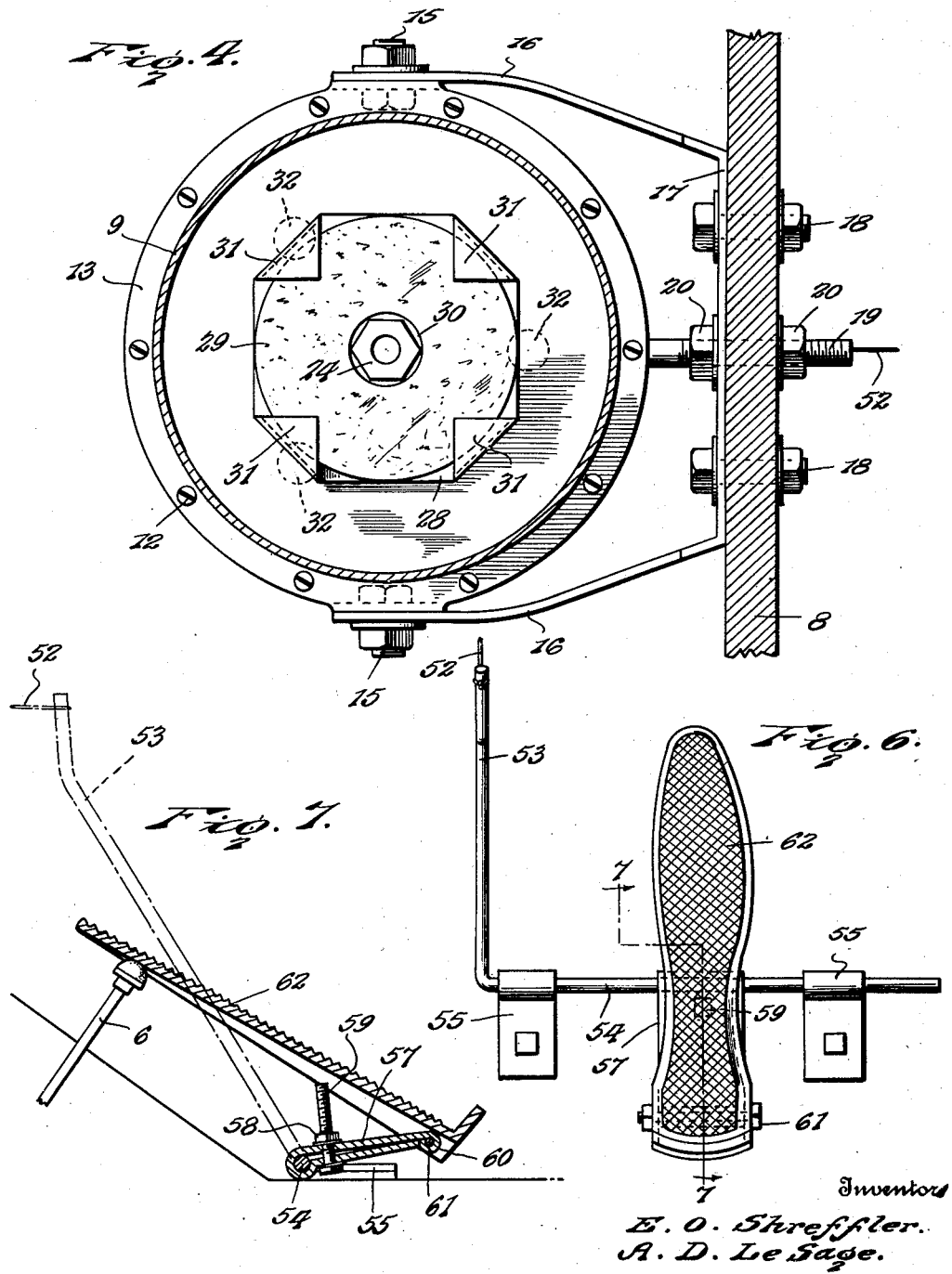

Patented Apr. 11, 1933

1,903,556

UNITED STATES PATENT OFFICE

ELWYNE O. SHREFFLER AND AARON D. LESAGE, OF MANTENO, ILLINOIS

VACUUM CONTROLLED CLUTCH AND BRAKE OPERATING MECHANISM

Application filed March 2, 1931. Serial No. 519,555.

This invention relates to actuating means for the brake and clutch controlling pedals of an automobile and more particularly to a device of this character controlled by vacuum created when the engine is in operation.

One object of the invention is to provide an apparatus of this character which may be applied as an accessory to an automobile having the usual brake and clutch controlling pedals and so associated with these pedals and with a foot rest or plate by means of which the accelerator plunger is actuated that the pedals for the brake and clutch will be actuated in proper timed relation to each other and to movements of the foot rest by means of which the accelerator plunger is controlled.

Another object of the invention is to so construct this device that the clutch may be thrown out before the brake is applied, thereby causing the brake and clutch to be operated in proper timed relation to each other when operating an automobile.

Another object of the invention is to permit a brake to be gradually or rapidly applied when stopping an automobile and to further permit the clutch to be thrown out and the automobile allowed to coast without the brake being applied if so desired.

Another object of the invention is to provide an improved vacuum tank and piston slidably mounted therein with the piston shaft extending through the bottom of the tank for connection with cables attached to the brake and clutch pedals, an improved valve being provided for controlling suction in the vacuum tank and so constructed that opening and closing of the valve to regulate movement of the piston in the tank may be accurately controlled by the operator of the automobile through manipulation of the pedal disposed over the accelerator plunger.

Another object of the invention is to provide a device of this character consisting of a comparatively few number of parts and adapted to be very easily applied to an automobile of a conventional construction.

The invention is illustrated in the accompanying drawings, wherein:

Figure 1 is a view showing the improved apparatus applied to an automobile of a conventional construction, Fig. 2 is an enlarged sectional view taken vertically through the vacuum tank and associated parts of the apparatus, Fig. 3 is a sectional view showing the valve in the lower portion of the hollow piston rod of Figure 2 in a raised position which permits a vacuum to be formed in the tank, Fig. 4 is a horizontal sectional view taken on the line 4—4 of Figure 2, Fig. 5 is a view showing the lower portion of the piston rod and associated parts in rear elevation, Fig. 6 is a top plan view of the foot treadle and associated parts, Fig. 7 is a sectional view taken along the line 7—7 of Figure 6, Fig. 8 is a top plan view of a guide engaged by cables connecting the piston rod with the brake and clutch pedals, Fig. 9 is a view similar to Figure 3 illustrating a modified form of valve, Fig. 10 is a side elevation of a modified form of the invention, Fig. 11 is a sectional view taken through the valve of Figure 10 along the line 11—11, and Fig. 12 is a fragmentary sectional view taken through a mounting for the vertically disposed valve adjusting rod of Figure 10.

The automobile which is shown in Figure 1 and indicated in general by the numeral 1 is of a conventional construction and is equipped with an internal combustion engine 2 having the usual intake manifold 3. The usual clutch and brake pedals 4 and 5 are provided and also an accelerator plunger 6 which extends through the footboard 7 beneath the panel 8.

The vacuum tank 9 is disposed in front of the panel 8 and is provided at its top with a head 10 formed integral with its walls and at its bottom with a head 11 which is firmly but detachably secured to the tank by bolts or equivalent fasteners 12 passed through registering openings formed in the marginal portions of the head 11 and in a flange 13 extending circumferentially about the walls of the tank. This head 11 is provided with depending ears 14 disposed in diametrically opposed relation to each other and perforated to receive bolts 15 by means of which the tank is connected to side wings 16 of a bracket or mounting 17 of strong sheet metal or any other desired material and firmly secured against the front face of the panel 8 by bolts 18.

A tube 19 having a downwardly curved forward end portion also extends through the panel and bracket near the lower end thereof and is firmly secured by nuts 20 carried by the threaded rear end portion of the tube. Since the vacuum tank is pivotally connected with the bracket 17 it can be tilted from a vertical position to an inclined position as shown in Figures 1 and 2 and thereby assume its proper position in front of the panel at one side of the engine.

A hollow piston rod 21 extends through a guide 22 formed upon the head 11 about a central opening in this head and the upper end of the piston rod is connected with a piston 23 by a hollow screw or bolt 24. The piston fits snugly in the vacuum tank and consists of upper and lower plates 25 and 26 formed of heavy metal between which is disposed a cup 27 formed of leather or any other flexible material found suitable for the purpose and having its marginal portions projecting from the discs and turned downwardly for close fitting engagement with walls of the vacuum tank. A sheet metal plate 28 rests upon the upper disc 25 about the screw or bolt 24 and after the bolt has been tightened, a pad 29 formed of felt or an equivalent material is set in place upon the plate 28 with the head of the bolt disposed in an opening formed centrally in the pad, and portions of the plate are bent over the pad as shown at 31 to firmly secure the pad in place upon the plate. This pad serves to absorb oil fumes, thereby providing in the vacuum tank sufficient moisture to prevent the leather disc or cup 27 from deteriorating due to lack of moisture. Openings 32 formed in the head at the bottom of the tank permit air to escape as the piston moves downwardly, thereby preventing downward movement of the piston being interfered with by an air cushion.

In order to connect the piston with the clutch and brake pedals, there have been provided cables 33 and 34 formed of flexible wire which may be either solid or twisted strands. These cables extend forwardly from the pedals and are engaged about pulley wheels 35 and 36 rotatably mounted upon an axle 37 consisting of a bolt carried by a bracket 38 bolted or otherwise firmly secured upon a suitable support at one side of the engine. After being engaged with the pulleys, the cables are extended upwardly and passed through openings formed near opposite ends of a rod 39 which is passed transversely through a block 40 threaded upon the lower end of the hollow piston rod and serving as a closure for the same. The rod 39 carries nuts 41 to bear against opposite side portions of the block 40 and firmly hold the rod in place, and other nuts 42 are provided upon the rod to engage the upper ends of the cables which pass through the openings in the rod and very firmly hold the cables in engagement with rod but permit them to be easily detached when necessary.

A flexible tube 43 extends between the manifold 3 and lower end portion of the piston rod 21 and has its upper end secured in any desired manner in an opening formed near the rear of the manifold and its lower end secured about a neck 44 leading from the piston rod as shown in Figure 2. A slot 45 is formed longitudinally in the piston rod at the opposite side thereof from the neck 44 and it should be noted that the lower end of this slot terminates at approximately the top of the neck 44. A sleeve valve 46 formed of a metal tube open at its upper and lower ends is slidably received in the lower portion of the piston rod and has its lower end cut at an incline as shown at 47. This sleeve valve is disposed within the piston rod as shown in Figures 2 and 3 and carries a pin or screw 48 which projects outwardly through the slot 45 and is surrounded by a sleeve or bushing 49 of sufficient diameter to fit snugly in the slot. The pin is located intermediate the upper and lower ends of the sleeve valve and adjacent its upper end this valve is formed with an opening 50 corresponding in diameter to the width of the slot 45 and adapted to be moved into and out of position to register with the slot by sliding the valve longitudinally in the piston rod. A spring 51 disposed in the piston rod with its upper end bearing against the lower end of the securing bolt 24 and its lower end bearing against the upper end of the valve normally retains the valve in the lowered position shown in Figure 2 and has a tendency to return it to this position when the valve is moved upwardly to the position shown in Figure 3. When the valve is in the position shown in Figure 2, the inner end of the neck 44 is closed so that suction cannot be created through the hollow piston to form a vacuum in the tank above the piston and the opening 50 registers with the slot so that the interior of the tank may have communication with the outer atmosphere and the weight of the piston cause it to move downwardly.

When the valve is in the raised position shown in Figure 3, the opening 50 is closed by being disposed above the slot and the inner end of the neck 44 is uncovered. Therefore suction may take place through the hollow piston rod and tube 43, thereby creating a vacuum in the tank to draw the piston and its rod upwardly. In order to actuate the valve, there has been provided a wire or equivalent flexible element 52 which extends through the tube 19 and has its forward end portion extending downwardly from this tube and secured about the pin 48 and its rear end attached to an arm 53 extending upwardly from a rocker shaft 54 rotatably mounted in bearings 55 secured upon the floor board 56 of the automobile. About the rocker shaft between the bearings is disposed a clamp 57 which tightly grips the rocker shaft when the nut 58 of the bolt 59 is tightened and by referring to Figure 7 it will be seen that the clamp extends rearwardly from the rocker shaft and at its rear end is formed with a bearing sleeve 60 to receive a pin or bolt 61 by means of which a foot treadle or plate 62 has its rear end pivoted to the clamp.

This treadle extends forwardly over the upper end of the bolt 59 with its forward end disposed over the accelerator plunger 6 and by an inspection of Figure 7 it will be readily understood that when the treadle is rocked forwardly to depress the accelerator plunger, the shaft 54 will be turned in a direction to swing the arm 53 forwardly whereas pressure upon the rear end portion of the treadle will allow the accelerator plunger to move upwardly and turn the shaft 54 in a direction to swing the arm 53 rearwardly and exert pull upon the wire 52.

When this apparatus is applied to the automobile as shown in Figure 1 and the cables 33 and 34 connected with the clutch and brake pedals, the foot treadle 62 rests upon the accelerator plunger and the upper end of the bolt 59 is disposed in spaced relation to the underface of the treadle. When starting the automobile, the rear end of the treadle is first pressed downwardly by heel pressure until the treadle engages the upper end of the bolt. The clutch is now thrown out and after the gears are shifted the treadle can be rocked forwardly to depress the accelerator plunger and speed up the engine. As the treadle rocks forwardly the shaft 54 rotates to move the arm 53 forwardly and the clutch will be thrown in in timed relation to speed of the motor. By again rocking the treadle rearwardly, the clutch will be thrown out and the gears can be again shifted. After all gear shifting has been performed, heel pressure is relieved and the treadle allowed to slide forwardly while still in engagement with the accelerator plunger and the treadle then serves as a foot rest pivoted at its rear end. By referring to Figures 1 and 2 it will be seen that when the treadle is depressed by heel pressure and the shaft 54 rotated, the arm 53 will be swung rearwardly, thereby drawing upon the wire 52 and shifting the valve upwardly a sufficient distance to close the opening 50 and open the inner end of the neck 44. Suction will then take place through the hollow piston rod 21 and tube 43 to create a vacuum in the tank 9 and the piston will be sucked upwardly and cause pull upon the cable 33. This will shift the clutch pedal to throw out the clutch and the gears can then be shifted, as the treadle will only be pressed downwardly a sufficient distance to cause the valve to be moved upwardly a short distance. The hollow piston rod will only be permitted to move upwardly a sufficient distance to throw out the clutch before the neck 44 is closed by the lower portion of the valve and the piston will remain in a raised position and retain the clutch thrown out until the treadle is rocked forwardly again to speed up the motor and swing the arm 53 forwardly to return the valve to the fully lowered position and uncover the opening 50. The vacuum in the tank will then be broken by air passing inwardly through the opening 50 and the piston will slide downwardly and allow the clutch pedal to return to its normal position with the clutch in.

When it is desired to stop the automobile, heel pressure is applied to the treadle 62 to rock it rearwardly and swing the arm 53 to exert pull upon the wire 52. This movement of the treadle relieves the accelerator plunger of pressure to cut down the speed of the engine and as the piston and its piston rod move upwardly, pull is first exerted upon the cable 33 to throw the clutch out and slack will then be removed from the cable 34 and pull exerted thereon to move the brake pedal in a brake-applying direction. Since the cable 33 is attached at the end of the clutch pedal and the cable 34 intermediate the length of the brake pedal, the pull upon the brake pedal will cause this pedal to catch up with the clutch pedal as they swing downwardly together and both pedals reach a fully depressed position at the same time. By properly regulating pressure applied to the rear portion of the treadle, the valve may be only shifted upwardly a sufficient distance to permit light braking pressure to be applied and this gradually increased by successively shifting the sleeve valve upwardly or pressure upon the rear end of the treadle may be continued in order to retain the valve in a raised position and cause the piston to move quickly to its fully raised position and apply the brakes with full force when a quick stop is necessary. After the brakes have been applied and it is desired to again start, pressure upon the rear end of the treadle is relieved and the treadle allowed to tilt forwardly so that the spring 51 may return the valve to its lowered position, thereby shutting off suction through the piston rod and permitting air to enter through the opening 50 to break the vacuum in the cylinder 9 and allow the piston to move downwardly. During this movement, pull upon the cables 33 and 34 is removed and the brake pedal first returns to its normal position to release the brakes and the clutch will then return to the operative position.

In Figure 9 there has been shown a slightly modified form of valve. This valve which is indicated by the numeral 63 is slidably mounted in a housing 64 firmly fixed to the piston rod 65, corresponding to the rod 21, and registering openings are formed in the walls of the piston rod and valve casing 64 to form a passage 66 establishing communication between the valve housing and the interior of the hollow piston rod. The neck 44 of the piston rod 21 is omitted in the piston rod 65 and instead there has been provided a neck 67 leading from the valve housing 64 for engagement by the flexible tube 43. An opening 68 constituting a vent is formed in the lower portion of the valve housing and upper and lower portions 69 and 70 of the valve are enlarged in order to have close contacting engagement with the walls of the valve housing and serve to close the opening 68 and inner end of the neck 67 when the valve is in adjusted positions. It should be noted that the upper portion 69 extends downwardly below the neck 67 to such an extent when the valve is in the lowered position that the lower portion 70 may close the opening 68 when the valve is shifted upwardly before the inner end of the neck 67 is uncovered. By this arrangement, the vent 68 may be closed and the neck 67 then opened in order to allow suction to take place in the hollow piston and create a vacuum in the tank or cylinder 9 to raise the piston rod when the valve is shifted upwardly against the action of the spring 71 by pull upon the wire 52. When the valve again moves downwardly, the inner end of the neck will be closed and the vent 68 then opened in order to allow air to pass inwardly through this vent and break the vacuum in the cylinder.

The operation of a device provided with this type of valve is the same as previously described.

In Figures 10, 11, and 12 there has been illustrated another modified form of the invention. The tank or cylinder 72 corresponds to the cylinder 9 and within this tank or cylinder is mounted a piston corresponding to the piston 23 and having its piston rod 73 extending downwardly through the removable head 74 at the bottom of the cylinder. The block 75 corresponding to the block 40 and carrying a cross rod 76 to which the cables 33 and 34 are attached is provided at the lower end of the piston rod 73 and to this block is secured an arm 77 which projects transversely therefrom and constitutes a support rotatably engaged by the lower end of a shaft or rod 78. This rod or shaft has its intermediate portion twisted and passed through a mounting or sleeve 79 rotatably supported in an ear 80 projecting from the bottom of the cylinder. The upper end of the rod is engaged through an opening formed in an arm 81 secured upon the head at the top of the cylinder. An arm 82 having an arcuate outer side edge formed with a groove 83 is secured upon the lower portion of the mounting or sleeve 79 and the forward end of a wire 84 corresponding to the wire 52 is engaged in the groove 83 and firmly secured at its front end so that when pull is exerted upon this wire, the rod may be rotated. A valve housing 85 is firmly mounted at one side of the cylinder or casing by a bracket 86 and has its lower end closed by a cap 87 and its upper end provided with a cap or head 88 from which extends a pipe 89 communicating with the cylinder 72 through an opening formed in the head at the top of the cylinder. The tube or flexible pipe 90 corresponding to the tube 43 is connected with the neck 91 projecting from the valve housing or casing 85 and at its opposite side the valve housing is formed with a slot 92 corresponding to the slot 45. A sleeve valve 93 is slidably mounted in the valve housing 85 and provided with an opening 94 movable into and out of position to register with the slot 92 by shifting the valve vertically in its housing and in order to permit the valve to be slid vertically and guided in its sliding movement, there has been provided a stem 95 which projects outwardly through the slot 92. This pin engages in a slot 96 formed in a cross-head 97 carried by an arm 98 projecting towards the valve housing from a sleeve 99 through which the shaft 78 passes. The openings in the sleeves 79 and 99 are rectangular in cross section to conform to the shape of the strip of metal from which the bar or rod 78 is formed. It should be noted that the cross-head 97 extends diagonally and when the sleeve 99 is turned to impart swinging movement to the arm 98 and its cross-head, engagement of the stem 95 with the walls of the slot 96 will cause a cam action to take place and shift the valve longitudinally in the valve housing. The brackets 100 carried by the valve housing and engaging the upper and lower ends of the sleeve 99 serve to prevent the sleeve from moving vertically but do not interfere with rotary motion of the sleeve or the spiral shaft. When this embodiment of the invention is in use, pull upon the wire 84 will rotate the sleeve 79 and rod 78, thereby causing the sleeve 99 to be turned and the cross-head 97 to be acted upon. The pin 95 will shift the sleeve valve upwardly similarly to the manner in which the sleeve valve 46 is shifted upwardly. The piston and its rod will then be drawn upwardly by vacuum created in the tank when suction takes place through the tubes 89 and 90 by way of the valve housing and as the rod 78 moves upwardly with the piston, movement of this rod through the sleeve 99 will rotate the sleeve and cause the valve to return to its lowered position provided pull upon the wire is not continued during upward movement of the piston.

It will thus be seen that the same operation formerly described may take place, but the mechanical construction by which it is accomplished is different from that shown in the preferred form.

What is claimed is:

1. In a motor vehicle, an engine having a manifold, a clutch pedal, a brake pedal, an accelerator plunger, and control means for said pedals comprising a cylinder, a piston in said cylinder having a piston rod extending through the lower head of the cylinder, means connecting said pedals with the piston rod, a tube having communication with the cylinder and manifold whereby a vacuum may be created in the cylinder to raise the piston and actuate the pedals, a valve to control passage of air into and out of said cylinder carried by said piston rod, a treadle in operative relation to said plunger, and means to actuate said valve when the treadle is moved.

2. In a motor vehicle, an engine having a manifold, a clutch pedal, a brake pedal, an accelerator plunger, and control means for said pedals comprising a cylinder, a piston in said cylinder having a piston rod extending through the lower head of the cylinder, means connecting said pedals with the piston rod, a tube having communication with the cylinder and manifold whereby a vacuum may be created in the cylinder to raise the piston and actuate the pedals, a valve to control passage of air into and out of said cylinder carried by said piston rod, a treadle in operative relation to said plunger, and actuating means for said valve connected with said treadle, the treadle being movable independent of said actuating means.

3. In a motor vehicle, an engine having a manifold, a clutch pedal, a brake pedal, an accelerator plunger, and control means for said pedals comprising a cylinder, a piston in said cylinder having a piston rod extending through the lower head of the cylinder, means connecting said pedals with the piston rod, a tube having communication with the cylinder and manifold whereby a vacuum may be created in the cylinder to raise the piston and actuate the pedals, a valve to control passage of air into and out of said cylinder carried by said piston rod, a rocker shaft rotatably mounted back of said plunger, an arm extending from said shaft, a flexible element connecting said arm and valve, a mounting rigidly carried by said shaft and projecting rearwardly therefrom, and a treadle pivoted to said mounting and projecting forwardly over said shaft and resting upon said plunger.

4. In a motor vehicle, an engine having a manifold, a clutch pedal, a brake pedal, an accelerator plunger, and control means for said pedals comprising a cylinder, a piston in said cylinder having a piston rod extending through the lower head of the cylinder, means connecting said pedals with the piston rod, a tube having communication with the cylinder and manifold whereby a vacuum may be created in the cylinder to raise the piston and actuate the pedals, a valve to control passage of air into and out of said cylinder carried by said piston rod, and actuating means for said valve including a foot operated treadle and flexible means connected with said valve.

5. In a motor vehicle, an engine having a manifold, a clutch pedal, a brake pedal, an accelerator plunger, and control means for said pedals comprising a cylinder, a piston in said cylinder having a piston rod extending through the lower head of the cylinder, means connecting said pedals with the piston rod, a tube having communication with the cylinder and manifold whereby a vacuum may be created in the cylinder to raise the piston and actuate the pedals, a valve to control passage of air into and out of said cylinder carried by said piston rod, a rocker shaft rotatably mounted back of said plunger, an arm extending from said shaft, a flexible element connecting said arm and valve, a mounting rigidly carried by said shaft and projecting rearwardly therefrom, a stem projecting upwardly from said mounting, and a treadle pivoted at its rear end to said mounting and projecting forwardly over the stem and shaft and resting upon said plunger.

6. In a motor vehicle, an engine having a manifold, a clutch pedal, a brake pedal, an accelerator plunger, and control means for said pedals and plunger including a vacuum cylinder, a piston in said cylinder having its piston rod extending through one head of the cylinder and connected with said pedals to impart movement thereto when the piston moves, a valve for controlling passage of air into and out of said cylinder when the engine is in operation, a tube leading from said manifold and connected with said valve, a treadle over said plunger, and means actuated by movements of said treadle to actuate said valve.

7. In a motor vehicle, an engine having a manifold, a clutch pedal, a brake pedal, an accelerator plunger, and control means for said pedals and plunger including a vacuum cylinder, a piston in said cylinder having a hollow piston rod extending outwardly from the cylinder and connected with said pedals, a treadle pivotally mounted and extending over the accelerator plunger, a tube establishing communication between the piston rod and manifold whereby a vacuum may be created in the cylinder and the piston moved to actuate said pedals, a valve in said piston rod movable into and out of position to shut off communication between the tube and cylinder and controlling entrance of air into the cylinder through the piston rod, and actuating means for said valve operatively connected with said treadle.

8. In a motor vehicle, an engine having a manifold, a clutch pedal, a brake pedal, an accelerator plunger, and control means for said pedals comprising a vacuum cylinder, a piston in said cylinder normally in a lowered position and moved upwardly when a vacuum is created in the cylinder, a piston rod extending from said piston through the lower head of said cylinder, means connecting the piston rod with said pedals, a tube leading from said manifold, said piston rod being hollow and having its lower portion constituting a valve housing and provided with a neck engaged by said tube whereby a vacuum may be created in the cylinder to raise the piston and actuate the pedals, a valve slidable in said housing and normally in closing relation to said neck, a portion being open to admit air into the cylinder when the neck is closed and being closed as the valve moves in a direction to uncover the neck, a treadle pivotally mounted, and means connecting said valve with said treadle to move the valve in a direction to open the neck when the treadle is rocked in one direction.

9. In a motor vehicle, an engine having a manifold, a clutch pedal, a brake pedal, an accelerator plunger, and control means for said pedals comprising a cylinder, a piston in said cylinder having a hollow piston rod extending through the lower head of said cylinder, the piston rod being closed at its lower end and provided with side arms, flexible elements connecting the side arms with said pedals to depress the pedals when the piston is raised, the piston rod constituting a valve housing, a tube leading from said manifold to the valve housing whereby air may be drawn out of the cylinder through the piston rod to form a vacuum in the cylinder and raise the piston, a valve in said valve housing movable upwardly to establish communication between the tube and hollow piston rod, a port being provided to admit air into the cylinder when the valve is in a lowered position, the port being closed when the valve is moved upwardly, and means to move the valve upwardly.

10. In a motor vehicle, an engine having a manifold, a clutch pedal, a brake pedal, an accelerator plunger, and control means for said pedals comprising a cylinder, a piston in said cylinder having a hollow piston rod extending through the lower head of said cylinder, the piston rod being closed at its lower end and provided with side arms, flexible elements connecting said arms with said pedals to depress the pedals when the piston is raised, the piston rod constituting a valve housing and having a neck leading therefrom and being formed with an opening above the neck, a hollow valve slidable in the valve housing and formed with a port exposed through the opening when the valve is in a lowered position in closing relation to the neck, a tube leading from said manifold to said neck, a stem extending from said valve through said opening, a spring in said piston rod yieldably resisting upward movement of the valve, and means to move said valve upwardly including a flexible element connected to said stem.

11. In a motor vehicle, an engine having a manifold, a clutch pedal, a brake pedal, an accelerator plunger, and control means for said pedals comprising a cylinder, a piston in said cylinder having a hollow piston rod extending through the lower head of said cylinder, the piston rod being closed at its lower end and provided with side arms, flexible elements connecting said arms with said pedals to depress the pedals when the piston is raised, the piston rod constituting a valve housing and having a neck leading therefrom and being formed with an opening above the neck, a hollow valve slidable in the valve housing and formed with a port exposed through the opening when the valve is in a lowered position in closing relation to the neck, a tube leading from said manifold to said neck, a stem extending from said valve through said opening, a spring in said piston rod yieldably resisting upward movement of the valve, a pedal pivotally mounted and extending over the accelerator plunger, an arm to be rocked when the pedal is moved, and a flexible element connecting said arm with the stem of said valve to draw the valve upwardly when the arm is rocked in one direction.

12. In a motor vehicle, an engine having a manifold, a clutch pedal, a brake pedal, an accelerator plunger, and control means for said pedals comprising a cylinder, a piston in said cylinder having a hollow piston rod extending through the lower head of said cylinder, the piston rod being closed at its lower end and provided with side arms, flexible elements connecting said arms with said pedals to depress the pedals when the piston is raised, the piston rod constituting a valve housing and having a neck leading therefrom and being formed with an opening above the neck, a hollow valve slidable in the valve housing and formed with a port exposed through the opening when the valve is in a lowered position in closing relation to the neck, a tube leading from said manifold to said neck, a stem extending from said valve through said opening, a spring in said piston rod yieldably resisting upward movement of the valve, a rocker shaft rotatably mounted back of the accelerator pedal, a clamp engaged about said shaft and projecting rearwardly therefrom, a fastener to secure the clamp in a fixed position upon the rocker shaft projecting upwardly from the clamp back of the shaft, a treadle pivoted at its rear end to the rear end of said clamp and projecting forwardly and resting upon the accelerator plunger, an arm extending upwardly from said rocker shaft, and a flexible element connecting said arm with the stem of said valve whereby the valve may be drawn upwardly when the pedal is depressed at its rear end to rotate the rocker shaft and swing said arm rearwardly.

13. Vacuum controlled operating means for the clutch pedal and brake pedal of a motor vehicle comprising a cylinder, a piston in said cylinder having a piston rod extending through the lower head of the cylinder, said piston rod being hollow and having a neck adjacent its lower end for engagement by a suction element and a slot above the neck, the lower end of said piston rod being closed and provided with means for engagement by pedal engaging elements, a hollow valve in said piston rod having a port to register with the opening in the piston rod when the valve is in a lower position to close said neck, a spring in said piston rod yieldably resisting upward movement of said valve, and a stem projecting from said valve outwardly through said opening for engagement by actuating means and serving to guide and limit movement of the valve.

14. Vacuum controlled operating means for the clutch pedal and brake pedal of a motor vehicle comprising a cylinder, a piston in said cylinder having a piston rod extending through the lower head of the cylinder, said piston rod being hollow and having its lower end closed and adapted for engagement by pedal engaging elements, a valve housing communicating with the lower portion of said piston rod and formed with a port near its lower end and a suction tube engaging neck spaced from its upper end, a valve slidable in said housing and having enlarged upper and lower portions, the lower portion being disposed below said port in open relation thereto when the upper portion is in position to extend across said neck in closing relation thereto and moving into position to close the port before the neck is uncovered when the valve is shifted upwardly, and a spring in the valve housing yieldably resisting upward movement of said valve.

15. Vacuum controlled operating means for the clutch pedal and brake pedal of a motor vehicle comprising a cylinder, a piston in said cylinder having a piston rod extending through the lower head of the cylinder and having its lower end adapted for connection with pedal engaging elements, a valve housing, a tube leading from the upper end of said housing and communicating with the upper end of said cylinder, said housing having a neck for engagement by a suction tube and a slot above the neck, a hollow valve slidable in said housing having a stem projecting out through said slot and being formed with a port to register with the slot when the valve is in a lowered neck closing position, a rod slidably and rotatably mounted and having its lower end connected with an arm projecting from said piston rod, a cam carried by said rod to turn therewith and engaging the valve stem to move the valve vertically when the rod is turned, means to initially turn said rod, and means to turn the rod in a reverse direction to reset the valve when the rod and piston rod move upwardly.

16. Vacuum controlled operating means for the clutch pedal and brake pedal of a motor vehicle comprising a cylinder, a piston in said cylinder having a piston rod extending through the lower head of the cylinder and having its lower end adapted for connection with pedal engaging elements, a valve housing, a tube leading from the upper end of said housing and communicating with the upper end of said cylinder, a valve in said housing to control passage of air into and out of said cylinder, a cam element to actuate said valve, an actuating rod for said cam connected with said piston rod and engaging the cam, means to initially rotate said rod to swing said cam and actuate said valve, and means to rotate the rod in a reversed direction and return the valve to its original position when the piston and rod move upwardly.

In testimony whereof we affix our signatures.

ELWYNE O. SHREFFLER. [L. S.]
AARON D. LESAGE. [L. S.]